(12) United States Patent
Martin Gomez et al.

(10) Patent No.: US 11,535,402 B2
(45) Date of Patent: Dec. 27, 2022

(54) SYSTEM AND METHOD FOR MONITORING THE DEGRADATION STATUS OF REFUELING HOSES ON AIR

(71) Applicant: AIRBUS DEFENCE AND SPACE, S.A.U., Getafe (ES)

(72) Inventors: Gonzalo Martin Gomez, Getafe (ES); Hector Sanchez Paredero, Getafe (ES); Francisco José Lagares Carrasco, Getafe (ES); Samuel De La Fuente Lopez, Getafe (ES)

(73) Assignee: Airbus Defence and Space, S.A.U., Getafe (ES)

( * ) Notice: Subject to any disclaimer, the term of this patent is extended or adjusted under 35 U.S.C. 154(b) by 362 days.

(21) Appl. No.: 16/842,304

(22) Filed: Apr. 7, 2020

(65) Prior Publication Data

US 2020/0317372 A1 Oct. 8, 2020

(30) Foreign Application Priority Data

Apr. 8, 2019 (EP) .................................. 19382261

(51) Int. Cl.
  *B64F 5/60* (2017.01)
  *B64D 39/02* (2006.01)
  *G01M 5/00* (2006.01)

(52) U.S. Cl.
  CPC ............... *B64F 5/60* (2017.01); *B64D 39/02* (2013.01); *G01M 5/0033* (2013.01); *G01M 5/0075* (2013.01)

(58) Field of Classification Search
  None
  See application file for complete search history.

(56) References Cited

U.S. PATENT DOCUMENTS

| 5,581,271 | A | * | 12/1996 | Kraemer | ................ | G09B 9/307 340/980 |
| 2005/0017130 | A1 | * | 1/2005 | Shelly | .................... | B64D 39/04 244/135 A |
| 2006/0278761 | A1 | * | 12/2006 | Cutler | .................... | B64D 39/00 244/135 A |

(Continued)

OTHER PUBLICATIONS

European Office Action for Application No. 19382261 dated Sep. 1, 2021.

(Continued)

*Primary Examiner* — Raul J Rios Russo
*Assistant Examiner* — Carl F. R. Tchatchouang
(74) *Attorney, Agent, or Firm* — Jenkins, Wilson, Taylor & Hunt, PA

(57) ABSTRACT

A system for monitoring the degradation status of refueling hoses on air includes a device with at least one sensor adapted to produce data about the external surface of the refueling hose. The method for monitoring the degradation status of refueling hoses on air includes moving a device with at least one sensor along a refueling hose or moving a refueling hose with respect to the device, producing data about the external surface of the refueling hose from the at least one sensor, and analyzing the data for monitoring the degradation status of the refueling hose. It allows providing a system and method for monitoring the degradation status of refueling hoses on air that reduces the risk of personal injury associated to hose damage inspection and is cost saving.

16 Claims, 3 Drawing Sheets

(56) References Cited

U.S. PATENT DOCUMENTS

| | | | | |
|---|---|---|---|---|
| 2007/0186671 | A1* | 8/2007 | Rogers | G01M 5/0025 |
| | | | | 73/800 |
| 2011/0268313 | A1 | 11/2011 | Winter et al. | |
| 2012/0294506 | A1 | 11/2012 | Verreet et al. | |
| 2013/0028377 | A1* | 1/2013 | Kovarik | B66F 11/042 |
| | | | | 378/59 |
| 2017/0023239 | A1* | 1/2017 | Cullen | F22B 37/38 |
| 2019/0322489 | A1 | 10/2019 | Watabe et al. | |

OTHER PUBLICATIONS

European Search Report for Application No. 19382261 dated Oct. 2, 2019.

\* cited by examiner

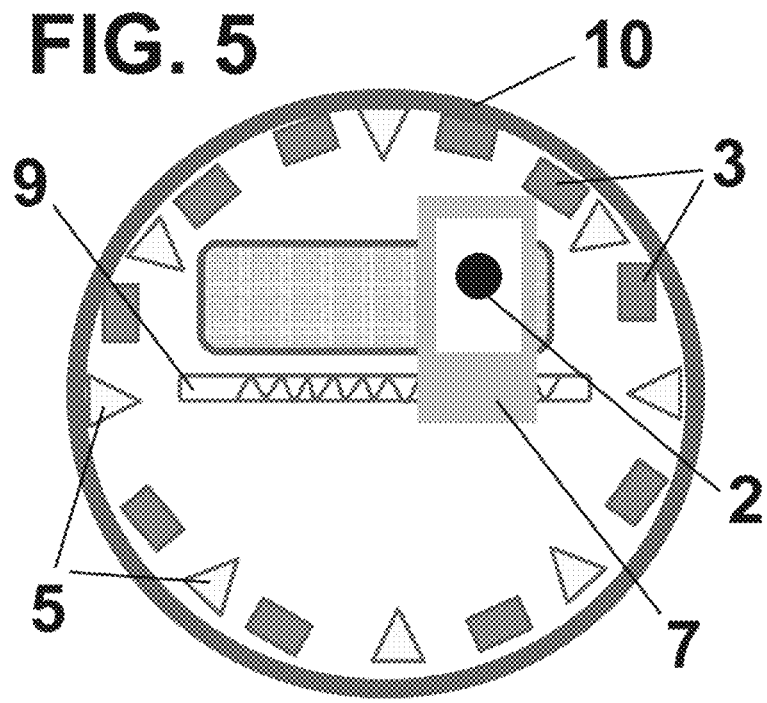

SYSTEM AND METHOD FOR MONITORING THE DEGRADATION STATUS OF REFUELING HOSES ON AIR

CROSS-REFERENCE TO RELATED APPLICATION

This application claims the benefit of and priority to European Patent Application No. 19382261.6 filed on Apr. 8, 2019, the entire disclosure of which is incorporated by reference herein.

TECHNICAL FIELD

The disclosure herein refers to a system and method for monitoring the degradation status of refueling hoses on air.

BACKGROUND

Air to air refueling hoses, i.e. hoses that are used for refueling aircrafts on air, need to be periodically checked to confirm the absence of damages which could have negative effects in safety or aircraft operation.

Current visual means in the aircraft do not allow the detection of such damages which could vary from a few millimeters to some centimeters. Such damages can include cracks, wear, exposed wire braid, kinks, blisters, crushes, etc.

Therefore, periodical checks are done by visual inspection on ground which requires the hose to be fully unwound by ground personnel. At the moment, this task is performed manually requiring considerable manpower and time resources.

By experience, it has been noticed that the inspection on ground introduces additional risk of damaging the hose (by normal handling) and that sometimes, hose damages occur at hose ground rewinding (after inspection is completed) and are therefore not detectable until the next inspection.

Sometimes, the hose has been damaged because of internal frictions (hose to hose) or by wear against adjacent structure while wrapping in the drum after being extended for maintenance or visual inspections.

Tension done by the ground engineers to manually extend/rewind it cannot be controlled and there is a risk to incorrectly wrap the hose in the drum after being extended for inspection. In addition, friction to Ground Support Equipment (stairs) has been confirmed to case large hose damages reducing their life.

In addition to visually inspection, several other inspection methods are being investigated to evaluate their capability to identify hose internal damages on ground, e.g. using eddy current inspection for hoses on ground.

Therefore, one purpose of the disclosure herein is to provide a system and method for monitoring the degradation status of refueling hoses on air that reduces the risk of personal injury associated to hose damage repetitive inspection and is cost saving considering the reduction in flight line maintenance personnel and man-hours dedicated to this task.

SUMMARY

With the system and method according to the disclosure herein it is possible to solve the drawbacks, providing additional advantages that are described below.

According to a first aspect, the disclosure herein refers to a system for monitoring the degradation status of refueling hoses on air, the system comprising a device comprising at least one sensor adapted or configured to produce data about the external surface of the hose.

The device can be adapted or configured to move along the refueling hose or the refueling hose can be adapted or configured to move with respect to the device.

According to a preferred embodiment, the at least one sensor is an infrared, visible and/or hyperspectral camera, and/or the at least one sensor can also be a laser sensor and/or an eddy current sensor.

The system for monitoring the degradation status of refueling hoses on air according to the disclosure herein can also comprise at least one mirror and/or at least one light source.

The light source is adapted or configured to emit a light at least partially in frequencies of sensibility of the sensor, in particular at least partially in frequencies of sensibility of a camera of the monitoring system. Therefore the light source, or lamp, may be emitting at least part of its light in infrared, and/or visible and/or cameras having sensors in visible spectra and other spectra and sensors technologies (such as hyperspectral or infrared, for instance) can be used to substitute or complement visual spectra sensors.

In embodiments wherein the monitoring system comprises a visible light sensor, such as a visible light camera, the daylight may not be enough to light the refueling hose, in particular in embodiments in which the movable device is placed within the refueling aircraft. The lamp allows to improve the quality of the inspection of the hose surface and obtain a reliable detection of damages.

Moreover, refueling activity may happen during the night. The lamp allows to monitor the hose surface during night operations as well.

The device may comprise one or more light sources. Multiple light sources may be arranged so as to ensure that more than one side of the circumference of the refueling hose is illuminated. Thereby simultaneous inspection of the whole circumference of a section of the refueling hose may be achieved.

Alternatively or in combination, the movable device may comprise one or more mirrors.

In some embodiments, the mirrors may be arranged to reflect daylight and/or light emitted by one or more light source(s) towards the surface of the refueling hose. The mirrors may be arranged to ensure that more than one side of the circumference of the refueling hose may be illuminated. In particular the mirror(s) may be arranged so that the whole circumference of the surface of a section of the refueling hose is illuminated.

The mirrors may alternatively or in combination reflect light from the surface of the refueling hose towards a sensor. For example, at least one mirror may be arranged so as to reflect the image of at least a portion of the surface of the refueling hose towards a sensor such as a camera.

One or more mirrors may be movable. Such movable mirror may allow to sweep a surface of the refueling hose with light, a laser, etc. so as to cover a large surface of the refueling hose with a reduced number of mirror(s). Illumination should be suitable (type and quantity) to the sensor used. It could be light at visible or infrared spectra, or laser or a magnetic field. The illumination should be enough to allow the sensor to capture the hose surface with enough sharpness and resolution.

According to alternative embodiments, the device is a ring adapted or configured to partially or completely surround the refueling hose, wherein the annular ring comprises rollers adapted or configured to move the ring along the refueling hose, the device is mounted on a serving carriage, or the device is fixed to a structure with the at least one sensor placed inside the structure.

According to a second aspect, the disclosure herein refers to a method for monitoring the degradation status of refueling hoses on air, the method comprising the following steps:

moving a device comprising at least one sensor along a refueling hose or moving the refueling hose with respect to the device;

producing data about the external surface of the hose from the at least one sensor; and analyzing the data for monitoring the degradation status of the refueling hose.

The analysis can be done manually by an operator or automatically by image processing. The analysis can be also done by a combination of manually by an operator and automatically by image processing.

To monitor all the external surface of the hose, it would be necessary to use several sensors, and the data obtained from the sensor should be processed to be presented to an operator in a proper way or for automatic defect recognition.

The information can be preferably obtained using infrared, visible and/or hyperspectral cameras, and/or using laser and/or eddy current sensors.

In the method according to the disclosure herein, the data is preferably produced using infrared, visible and/or hyperspectral cameras and the information is preferably obtained using laser and/or eddy current sensors.

The method for monitoring the degradation status of refueling hoses on air according to the disclosure herein can also comprise the step of illuminating at least part of the external surface of the refueling hose and/or the step of producing data can be carried out reflecting the image of the external surface of the refueling hose by one or more mirrors.

Advantageously, in the method for monitoring the degradation status of refueling hoses on air, the steps of moving the movable device, producing data and analyzing the data are carried out in flight during the unwinding and/or rewinding of the refueling hose.

The system and method according to the disclosure herein permits to allow hose inspection to be done without requiring the hose to be extended on ground providing, at least, the following benefits:

As the hose do not need to be extended, it reduces the risk of personal injury associated to hose damage repetitive inspection.

Cost saving considering the reduction in flight line maintenance personnel and man-hours dedicated to this task along all the operative life of a tanker aircraft. In addition, if the hose is not trailed on ground, this source of damages is eliminated increasing the Mean Time Between Failures (MTBF) of the trailing components.

Aircraft operational benefits: Having a more effective and quick method to identify hose damages would improve the aircraft dispatch reliability and operational availability.

It eliminates hidden damages caused by the inspection, making feasible the non-detection of some defects in the lower part and causing damages due to friction against GSE and pavement. As the hose do not require being extended for inspection, hose damages caused by ground handling would be reduced and de-linked from hose damage inspection.

Furthermore, air to air hoses inspection in flight requires the following advantages, which are also obtained by the disclosure herein:

360 degrees of inspection;
Qualification against potential explosive atmosphere;
Low emissivity (EMI/EMC);
Airborne environmental conditions;
Variable focal distance (hose to aircraft relative movements in 3 axis)

BRIEF DESCRIPTION OF THE DRAWINGS

For a better understanding the above explanation and for the sole purpose of providing an example, some non-limiting drawings are included that schematically depict a practical embodiment.

FIG. 5 is a diagrammatical frontal view of a third embodiment of the monitoring system according to the disclosure herein.

DETAILED DESCRIPTION

Figure 1:
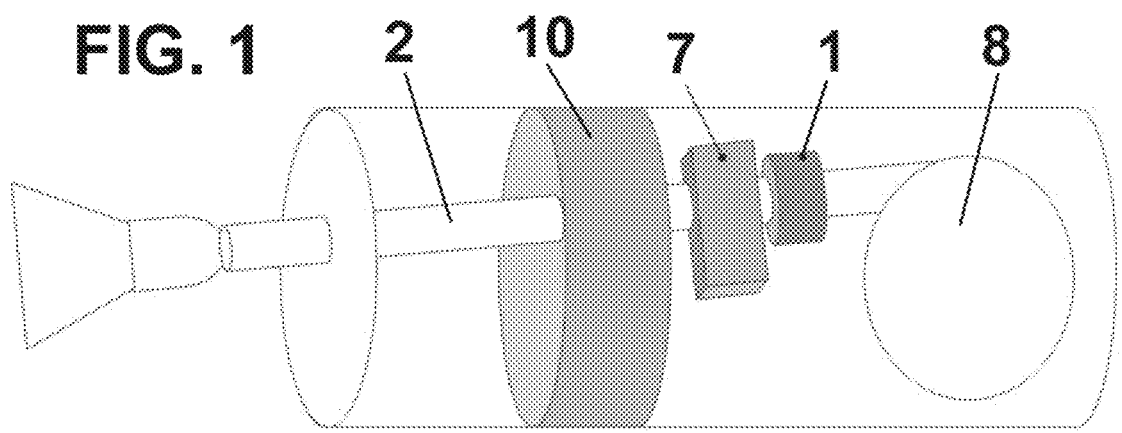
FIG. 1 is a diagrammatical side view of a refueling system showing the positioning of three alternative embodiments of the monitoring system according to the disclosure herein.

FIG. 1 is a diagrammatical side view of a refueling system showing the positioning of three alternative embodiments of the monitoring system according to the disclosure herein, which will be described hereinafter.

FIG. 1 shows the position of a device 1, 7 or 10 with respect to a refueling hose 2 and a drum 8 where the hose is rolled up when it is not in use.

Figure 2:
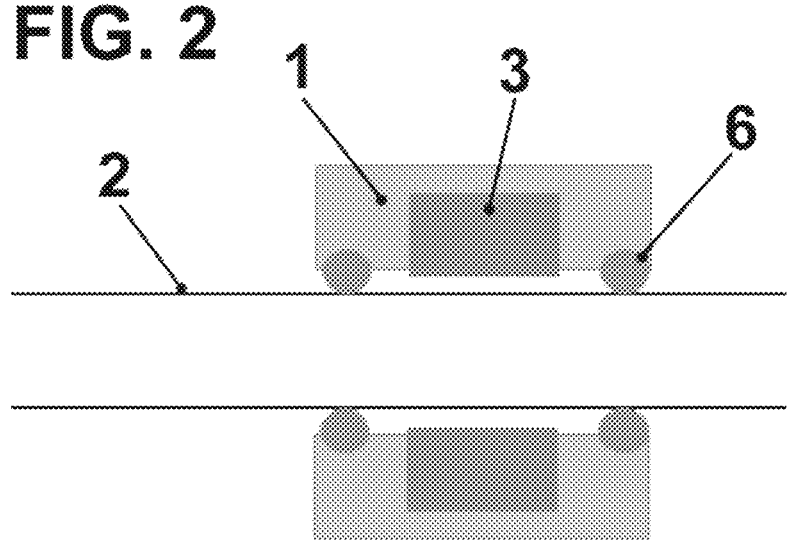
FIG. 2 is a diagrammatical side view of a first embodiment of the monitoring system according to the disclosure herein in its use position.

FIG. 2 shows a first embodiment of the system for monitoring the degradation status of refueling hoses on air.

According to this embodiment the system comprises a device, that in this case is a ring 1, that is placed for surrounding partially or completely a refueling hose 2 and that can move longitudinally along this refueling hose 2, so that the whole length of the hose 2 can be monitored.

This ring 1 comprises at least one sensor 3, preferably a plurality of sensors, that covers preferably the whole circumference of the refueling hose 2, so that the whole external surface of the refueling hose 2 is monitored during the refueling operation.

According to the shown embodiment, the ring 1 can be moved along the refueling hose 2 by rollers 6, and the movement is driven by a serving carriage 7, which is a conventional component of a on air refueling system. This means that the annular ring 1 is moored to the serving carriage 7.

This embodiment permits to keep a constant distance from the sensor 3 to the inspected surface of the refueling hose 2, allowing eddy current or laser technologies to be used for hose damage inspection.

The constant distance from sensors 3 to the refueling hose 2 allowing is kept by the rollers 6, which allows the ring 1 to be mounted on the refueling hose 2 and the only relative movement from the refueling hose 2 to ring is the longitudinal direction (flight direction).

The at least one sensor 3 can be any kind of sensor that permits to monitoring the external surface of the refueling hose 2. Just as some examples, infrared, visible and/or hyperspectral cameras, and/or laser sensors and/or an eddy current sensor can be used, which also provides information about internal damages in the metal structure of the hose.

With this monitoring system, the following method comprising the following steps is carried out.

When the ring 1 moves along the refueling hose 2, data is produced about the external surface of the refueling hose 2 from the sensor(s) 3.

These data are sent to an external device, not shown in the drawings, e.g. a screen or a computer, where the data is analyzed monitoring the degradation status of the refueling hose 2, determining if the degradation status is within preset parameters or not.

This analysis can be done manually by an operator viewing the information on a screen and/or automatically by image processing in the computer.

Figure 3:
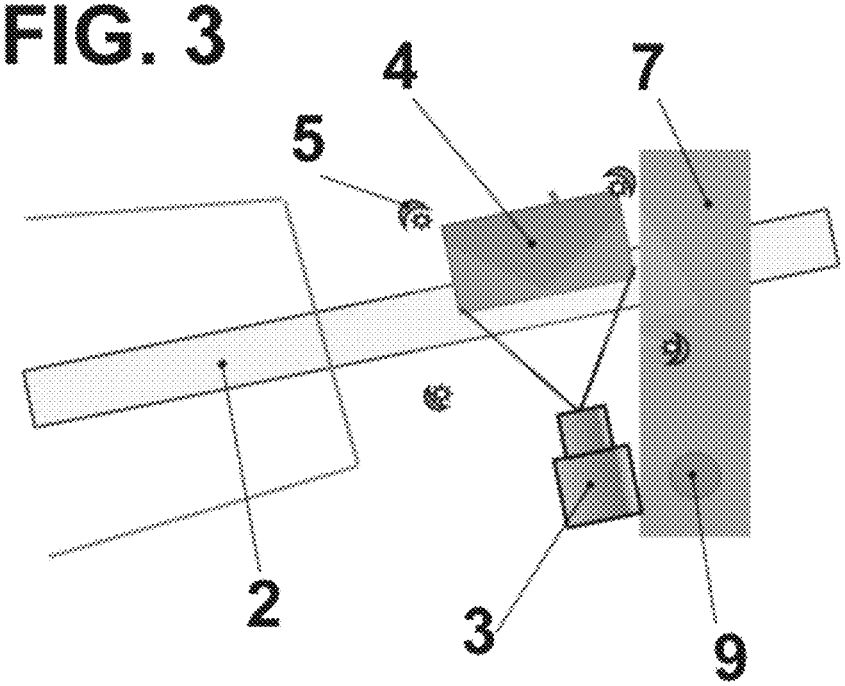
FIG. 3 is a diagrammatical side view of a second embodiment of the monitoring system according to the disclosure herein.
Figure 4:
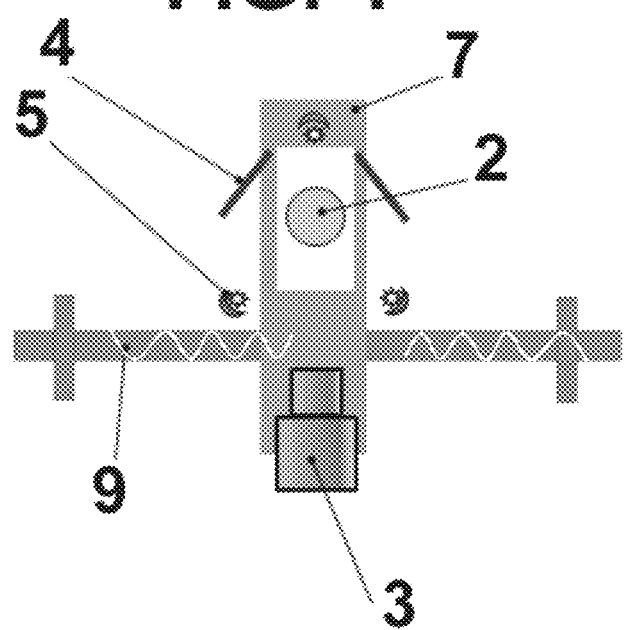
FIG. 4 is a diagrammatical frontal view of the second embodiment of the monitoring system according to the disclosure herein.

A second embodiment of the monitoring system according to the disclosure herein is shown in FIGS. 3 and 4.

For simplicity reasons, the same numerals references are used for identifying the same or similar elements.

In this embodiment, the main difference is that the device is mounted on the serving carriage 7, so that no additional device is necessary.

This serving carriage 7 comprises a shaft 9 with an Archimeadean groove that drives an alternating translating movement of the serving carriage 7.

The serving carriage 7 allows winding the refueling hose 2 in such a way to avoid jamming. It is a carriage 7 mechanically moved by the Archimedean shaft 9 (or any other electromechanical device) conducting the refueling hose 2 to the proper location in the drum 8 while winding or unwinding.

Upon winding and unwinding of the refueling hose 2, the refueling hose 2 passes through an opening in the serving carriage 7, while the serving carriage translates alternatively in one direction and in the opposite direction along the shaft 9 so as to ensure that the refueling hose is orderly arranged on the drum 8.

In this case, the system comprises a camera that is used as a sensor 3, even though any other kind of sensor could be used.

For permitting a better monitoring of the whole external surface of the refueling hose 2, in this embodiment the system comprises mirrors 4 and light sources 5, so that just with one camera the whole external surface of the refueling hose 2 can be covered. The complexity and therefore manufacturing costs maintenance costs of such device are thus limited.

In this embodiment, the monitoring method is the same as that described previously, When the serving carriage 7 moves along the refueling hose 2, data are produced about the external surface of the refueling hose 2 by the sensor (camera) 3.

These data are also sent to an external device, not shown in the drawings, e.g. a screen or a computer. The data are analyzed in the screen or computer, monitoring the degradation status of the refueling hose 2, and determining if the degradation status is within preset parameters or not.

Also, in this case, this analysis can be done manually by an operator viewing the information on a screen and/or automatically by image processing in the computer.

This analysis made manually by an operator means that the operator checks in the screen the external surface of the refueling hose 2 and analyzes if the hose has any sign of degradation.

The automatic analysis by image processing is carried out by software in the computer, such as comparing the obtained data with preset data when the hose has no degradation and determining if those differences in the data can be enough to show a sign of degradation in the hose.

A third embodiment of the monitoring system according to the disclosure herein is shown in FIG. 5.

For simplicity reasons, the same numerals references are used for identifying the same or similar elements.

In this third embodiment, the main difference from the second embodiment that the device is fixed to a structure 10 comprising a plurality of sensors 3 (preferably cameras) and light sources 5 placed on its internal surface. In this embodiment, it is the refueling hose 2 which is moved with respect to the structure 10.

In FIG. 5 it is shown the position of the serving carriage 7 and its shaft 9 with the Archimeadean groove that drives an alternating translating movement of the serving carriage 7.

In this embodiment, the monitoring method is the same as that described previously, When the serving carriage 7 moves along the refueling hose 2, data are produced about the external surface of the refueling hose 2 by the sensors 3. The illumination provided by the light sources 5 and optical parameters are adjusted depending on the relative position between refueling hose 2 and the sensors 3.

These data are also sent to an external device, not shown in the drawings, e.g. a screen or a computer. The data are analyzed in the screen or computer, monitoring the degradation status of the refueling hose 2, and determining if the degradation status is within preset parameters or not.

Also, in this case, this analysis can be done manually by an operator viewing the information on a screen and/or automatically by image processing in the computer, as described previously.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims.

The invention claimed is:

1. An air refueling system for monitoring degradation status of a refueling hose on air, the air refueling system comprising:
   a drum;
   a serving carriage configured to allow winding of the refueling hose in such a way as to avoid jamming by conducting the refueling hose to a location in the drum during winding of the refueling hose into the drum or unwinding of the refueling hose from the drum;
   a monitoring system comprising a device comprising at least one sensor configured to produce data about an external surface of the refueling hose;
   wherein the air refueling system is configured for positioning the monitoring system; and wherein the device is:
    mounted on the serving carriage; or
    a ring configured to partially or completely surround the refueling hose and to move longitudinally along the refueling hose so that an entire length of the refueling hose can be monitored, the ring being moored to the serving carriage for being driven by the serving carriage.

2. The air refueling system of claim 1, wherein the refueling hose is configured to move with respect to the device.

3. The air refueling system of claim 1, wherein the at least one sensor is an infrared, visible, and/or hyperspectral camera.

4. The air refueling system of claim 1, wherein the at least one sensor is a laser sensor and/or an eddy current sensor.

5. The air refueling system of claim 1, wherein the system comprises at least one mirror.

6. The air refueling system of claim 1, wherein the system comprises at least one light source.

7. The air refueling system of claim 1, wherein the device is configured to partially or completely surround the refueling hose.

8. The air refueling system of claim 7, wherein the at least one sensor is a constant distance from the external surface of the refueling hose.

9. The air refueling system of claim 1, wherein the serving carriage comprises a shaft with an Archimedean groove that is configured to drive an alternating translating movement of the serving carriage.

10. The air refueling system of claim 1, wherein the ring comprises rollers configured to move the ring along the refueling hose.

11. The air refueling system of claim 1, wherein the at least one sensor is a constant distance from the external surface of the refueling hose.

12. A method for monitoring the degradation status of a refueling hose on air, the method comprising:
    providing an air refueling system comprising:
        a drum;
        a serving carriage formed in a manner to allow winding of the refueling hose in such a way as to avoid jamming by conducting the refueling hose to a location in the drum during winding or unwinding of the refueling hose;
        a monitoring system comprising a device comprising at least one sensor;
        wherein the monitoring system can be positioned by the air refueling system; and
        wherein the device is:
            mounted on the serving carriage; or
            a ring that partially or completely surrounds the refueling hose and to move longitudinally along the refueling hose so that an entire length of the refueling hose can be monitored, the ring being moored to the serving carriage for being driven by the serving carriage;
    winding the refueling hose into the drum or unwinding the refueling hose from the drum such that the refueling hose is moved with respect to the device comprising the at least one sensor;
    producing data about an external surface of the refueling hose from the at least one sensor; and
    analyzing the data to monitor the degradation status of the refueling hose.

13. The method of claim 12, wherein the analysis is conducted manually by an operator and/or automatically by image processing.

14. The method of claim 12, comprising illuminating at least part of the external surface of the refueling hose.

15. The method of claim 12, wherein producing data is carried out reflecting an image of the external surface of the refueling hose by one or more mirrors.

16. The method of claim 12, wherein moving the refueling hose, producing data, and analyzing the data are performed in flight during unwinding and/or winding of the refueling hose.

* * * * *